(12) United States Patent
Chow et al.

(10) Patent No.: US 11,413,891 B2
(45) Date of Patent: Aug. 16, 2022

(54) SYSTEM AND METHOD FOR SIMULTANEOUSLY MOVING OBJECTS BETWEEN MULTIPLE LOCATIONS

(71) Applicant: CreateMe Technologies LLC, New York, NY (US)

(72) Inventors: Lai Chyan Chow, Daly City, CA (US); David Matten, San Francisco, CA (US); Nicholas Chope, Portland, OR (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/491,419

(22) Filed: Sep. 30, 2021

(65) Prior Publication Data

US 2022/0143994 A1     May 12, 2022

Related U.S. Application Data

(63) Continuation-in-part of application No. 17/364,694, filed on Jun. 30, 2021, now Pat. No. 11,254,154, and a continuation-in-part of application No. 17/232,089, filed on Apr. 15, 2021, now Pat. No. 11,161,353.

(60) Provisional application No. 63/111,591, filed on Nov. 9, 2020.

(51) Int. Cl.
    *B41J 29/38*       (2006.01)
    *B65G 1/137*      (2006.01)
    *B65G 47/88*      (2006.01)

(52) U.S. Cl.
    CPC ............ *B41J 29/38* (2013.01); *B65G 1/1375* (2013.01); *B65G 47/8838* (2013.01); *B65G 47/8853* (2013.01); *B65G 47/8869* (2013.01)

(58) Field of Classification Search
    CPC ......... H01L 21/67178; H01L 21/67778; H01L 21/67781
See application file for complete search history.

(56) References Cited

U.S. PATENT DOCUMENTS

| | | | |
|---|---|---|---|
| 8,113,141 B2 * | 2/2012 | Oh | .................... H01L 21/67178 414/935 |
| 9,305,819 B2 * | 4/2016 | Saito | ................. H01L 21/67178 |

OTHER PUBLICATIONS

Yecise Automation, PFDD Direct Drive Robot—The Next Generation of Collaborative Robots, retrieved Aug. 20, 2021, 2 pages <http://preciseautomation.com/PFDD.html>.

* cited by examiner

*Primary Examiner* — Lam S Nguyen
(74) *Attorney, Agent, or Firm* — Patterson + Sheridan, LLP

(57) ABSTRACT

Embodiments provide for a conveying system to move multiple articles from one location to another. The conveying system may use a transport device to grasp each article from an initial location, rotate the articles away from the initial locations, move the articles linearly, and rotate the articles to destination locations. Rather than moving each article one-by-one, in the embodiments described herein, the conveying system can move multiple articles simultaneously to various locations where each location may contain a different process to perform on the article. Moving multiple articles simultaneously shortens the time required to process the articles.

13 Claims, 11 Drawing Sheets

SYSTEM AND METHOD FOR SIMULTANEOUSLY MOVING OBJECTS BETWEEN MULTIPLE LOCATIONS

CROSS-REFERENCE TO RELATED APPLICATIONS

This application is a continuation-in-part of U.S. Pat. No. 11,254,154, filed Jun. 30, 2021 entitled "GARMENT PERSONALIZATION WITH AUTONOMOUS ROBOTS", and U.S. Pat. No. 11,161,353, filed Apr. 15, 2021 and entitled "PERSONALIZATION VENDING KIOSK", which are herein incorporated by reference in their entirety.

BACKGROUND

Movement of articles, such as parts and platens, is an important part of production and assembly processes. Conventional systems and methods for moving articles are limited in their capability or may not be suitable for certain production environments such as ones with limited space. Keeping with this example, articles may be moved using manual or automated handling. Manual handling includes moving the materials with an operator or operators, which is a repetitive process in which limited articles may be moved at a time. Automated handling includes robotic systems such as a robot arm or vehicle to move items from point A to point B. Robotic arms are complex, having multiple joints, and require specialty programming. Robotic vehicles are also complex and limited by terrain. The challenge of moving articles is further complicated when transporting objects between different compartments or chambers located at different heights.

In one such example, personalization of garments through embroidery and various methods of printing art on the garment, including screen printing, dye sublimation and Direct To Garment (DTG) printing accessories requires moving an article between multiple process stages. Large-scale DTG printing operations can include multiple processing stages, such as loading, pretreatment, drying, and quality control that are performed serially. Each stage may require a different amount of time to complete and be located in a different location. Because of this, time is lost waiting for longer stages in the serialized chain or when transporting the garment between stages.

Accordingly, there is a need for an improved system for moving articles, such as garments, that can simultaneously move multiple articles between different locations.

SUMMARY

Certain embodiments provide a conveying system. The conveying system includes a plurality of linear actuators; a plurality of carriers, wherein each carrier of the plurality of carriers is attached to a linear actuator of the plurality of linear actuators; and a rotary actuator configured to rotate the plurality of carriers about a shared axis of rotation.

Other aspects provide a conveying system. The conveying system includes a plurality of linear actuators attached a shaft; a plurality of carriers attached to the shaft and respective ones of the plurality of linear actuators; and a rotary actuator configured to rotate the shaft along with the plurality of carriers.

Other aspects provide a method for moving a plurality of articles simultaneously. The method includes grasping each article of the plurality of articles from a module of a plurality of initial modules; rotating simultaneously the plurality of articles a first angle in a first direction; moving at least one article of the plurality of articles linearly; rotating simultaneously the plurality of articles a second angle in a second direction; and placing each article of the plurality of articles in a module of a plurality of destination modules.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments herein describe a system and method for simultaneously moving multiple articles between different locations at different heights, such as compartments or chambers.

Embodiments herein describe a conveying system to move multiple articles from one location to another. The conveying system may use a transport device to grasp each article from an initial location, rotate the articles away from the initial locations, move the articles linearly, and rotate the articles to destination locations. Rather than moving each article one-by-one, in the embodiments described herein, the conveying system can move multiple articles simultaneously to various locations where each location may contain a different process to perform on the article. Moving multiple articles simultaneously shortens the time required to process the articles.

Each location may include a process module to perform a different stage of a process on the article or an object placed on the article, e.g., a garment disposed on a platen as part of a digital printing process. The process modules may be vertically stacked on top of one another to reduce the distance between them, which beneficially results in a compact digital printing environment when compared to, for example, conventional Direct To Garment (DTG) printing operations. Doing so decreases time for the conveying system to transport the articles between stages. In the embodiments herein, a conveying system can move the garments to any available stage amongst the process modules. This may reduce the overall cost of the system, reduce the footprint of the, e.g., digital printing environment, and improve the throughput (e.g., reduce the time needed for a garment to complete the digital printing process).

The stackable, modular design of the processing modules and the conveying system further allows scalability because additional modules may be added or removed as needed. For example, additional modules may be stacked on top of the existing modules while keeping the existing footprint of the processing environment.

The embodiments herein specifically discuss the conveyor system in a digital printing environment as one example, but the conveyor system can be applied to fulfill any storage and retrieval needs such as moving boxes in a warehouse, storing items that can later be retrieved to fulfill customer orders, packaging items, and the like. The embodiments herein may also be applied to moving other articles such as platens, trays, jigs, fixtures, containers, materials to be processed, boxes, and crates and the like.

Examples Conveying Systems in a Digital Printing Environment

Figure 1A:
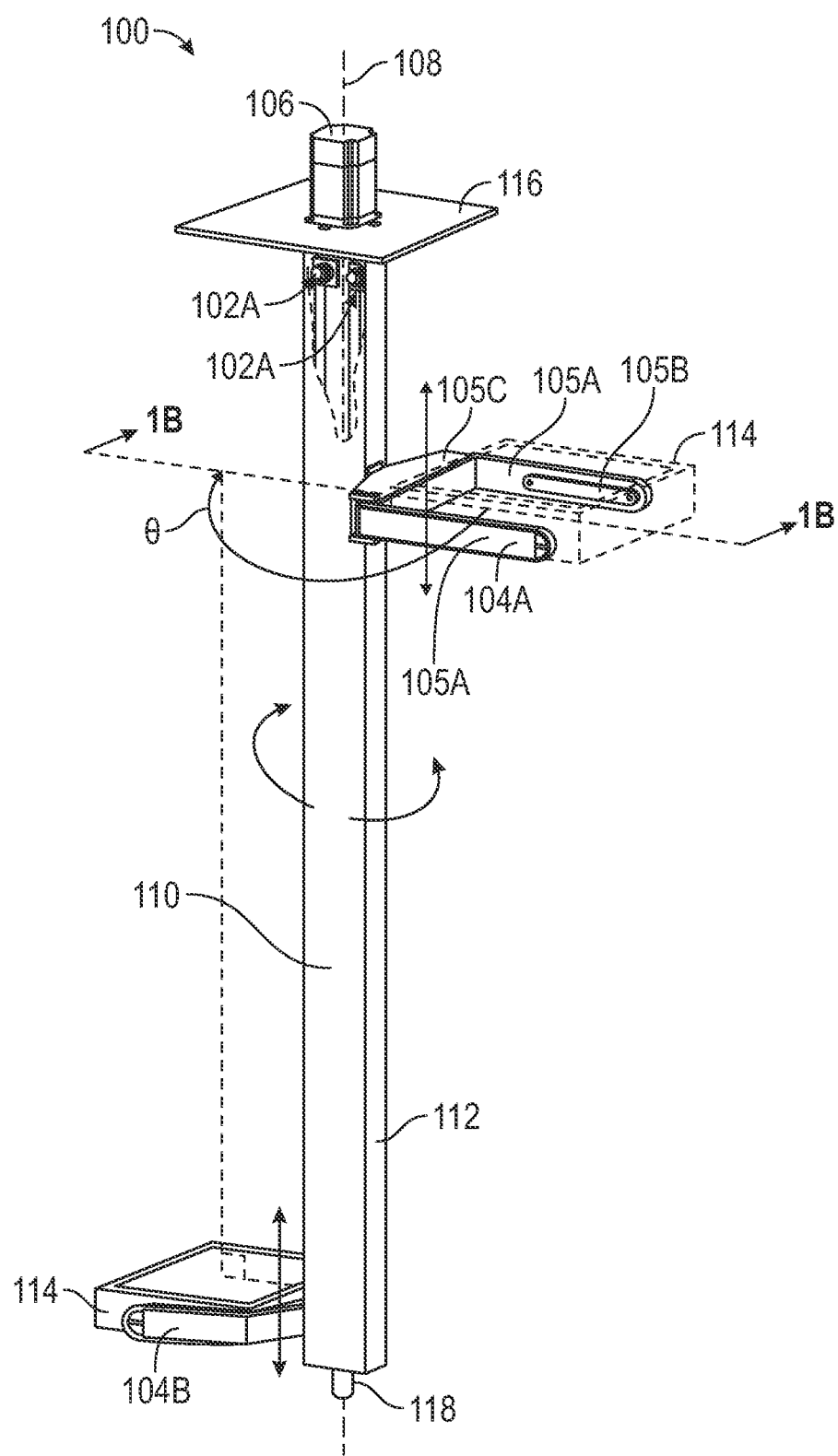
FIG. 1A is a transport device of a conveying system, according to one embodiment.

FIG. 1A is a transport device 100 of a conveying system, according to one embodiment. In particular, the transport device 100 may be used to move multiple articles 114 between different locations at different heights.

The transport device 100 comprises a plurality of linear actuators 102 (e.g., 102A and 102B), a plurality of carriers 104, and a rotary actuator 106. Each carrier of the plurality of carriers 104 (e.g., 104A and 104B) is attached to a linear actuator of the plurality of linear actuators 102. For example, a first carrier 104A and a second carrier 104B each connect to a linear actuator 102 as discussed in relation to FIG. 1B. The carriers 104A and 104B are each configured to grasp and move an article 114. When moving the article 114, each carrier 104A and 104B may be actuated independently of other carriers 104. For example, the linear actuator 102A may be configured to move the carrier 104A at different velocities or accelerations and to different destinations than the linear actuator 102б attached to the carrier 104б. The carrier 104A may also be actuated while the carrier 104B remains stationary and vice versa.

In the depicted embodiment, the linear actuators 102 are disposed inside a shaft 110 and the carriers 104 are connected to the shaft 110. Each carrier 104A and 104B may move vertically on a track 112 (one of which is shown) of the shaft 110 when actuated. The rotary actuator 106 rotates the carriers 104 about a shared axis of rotation 108. In the depicted embodiment, the rotary actuator 106 rotates the shaft 110, which in turn rotates the carriers 104. Each carrier 104A and 104B may be rotated the same angle about the axis of rotation 108 and in the same direction. Thus, the carriers 104 may move the articles 114 linearly and rotatably. In some embodiments, the carriers 104 may be configured to grasp or pick up the articles 114, rotate a first angle about the shared axis of rotation 108, move the articles 114 vertically, and rotate a second angle about the shared axis of rotation 108 to position each article 114. In some embodiments, the first and second angles may be equal. In some embodiments, the first and second angles may be 90 degrees apart or remain 90 degrees apart while the transport device 100 moves the articles 114.

Figure 1B:
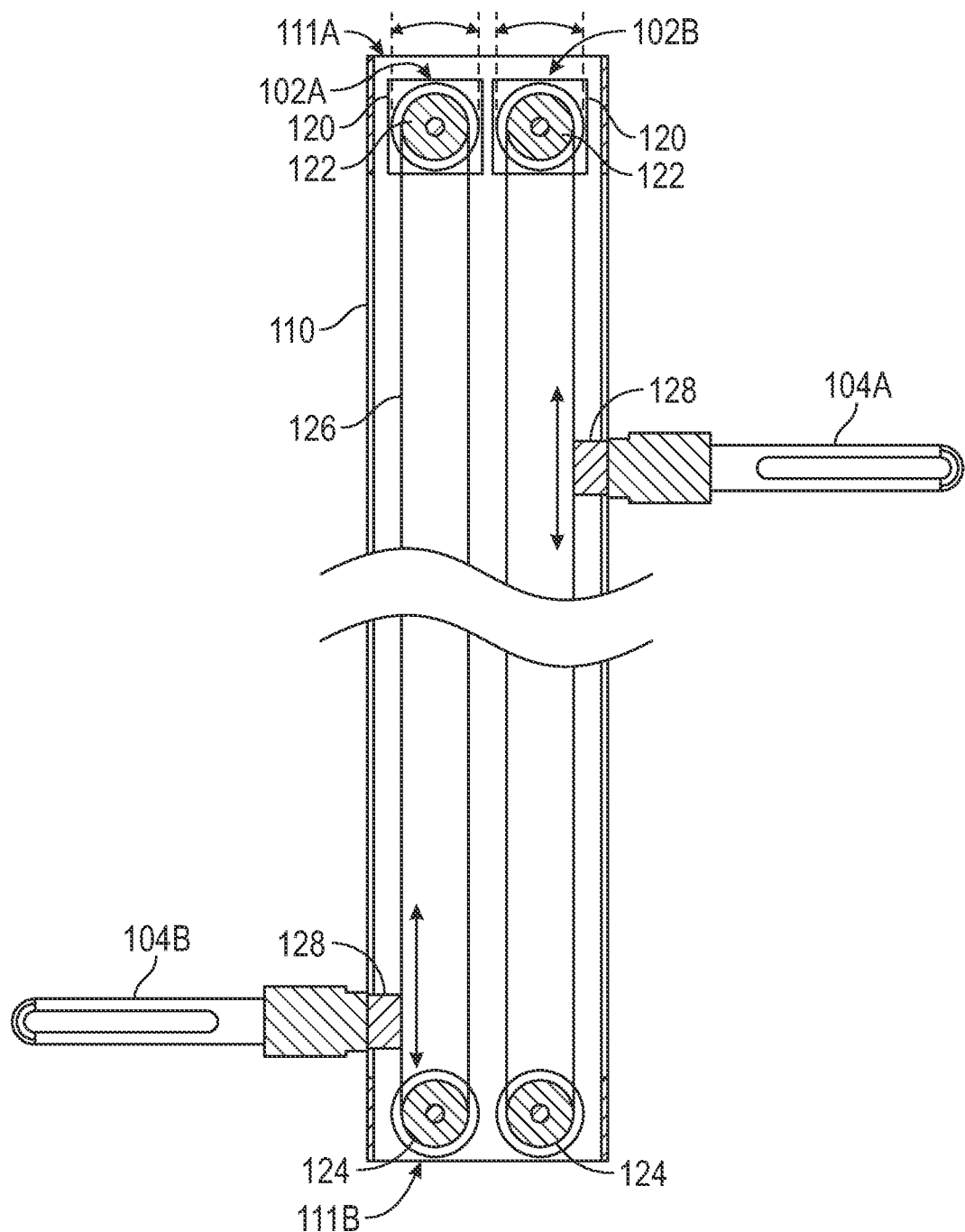
FIG. 1B is a cross-sectional view of the conveying system from FIG. 1A, according to one embodiment.
Figure 1C:
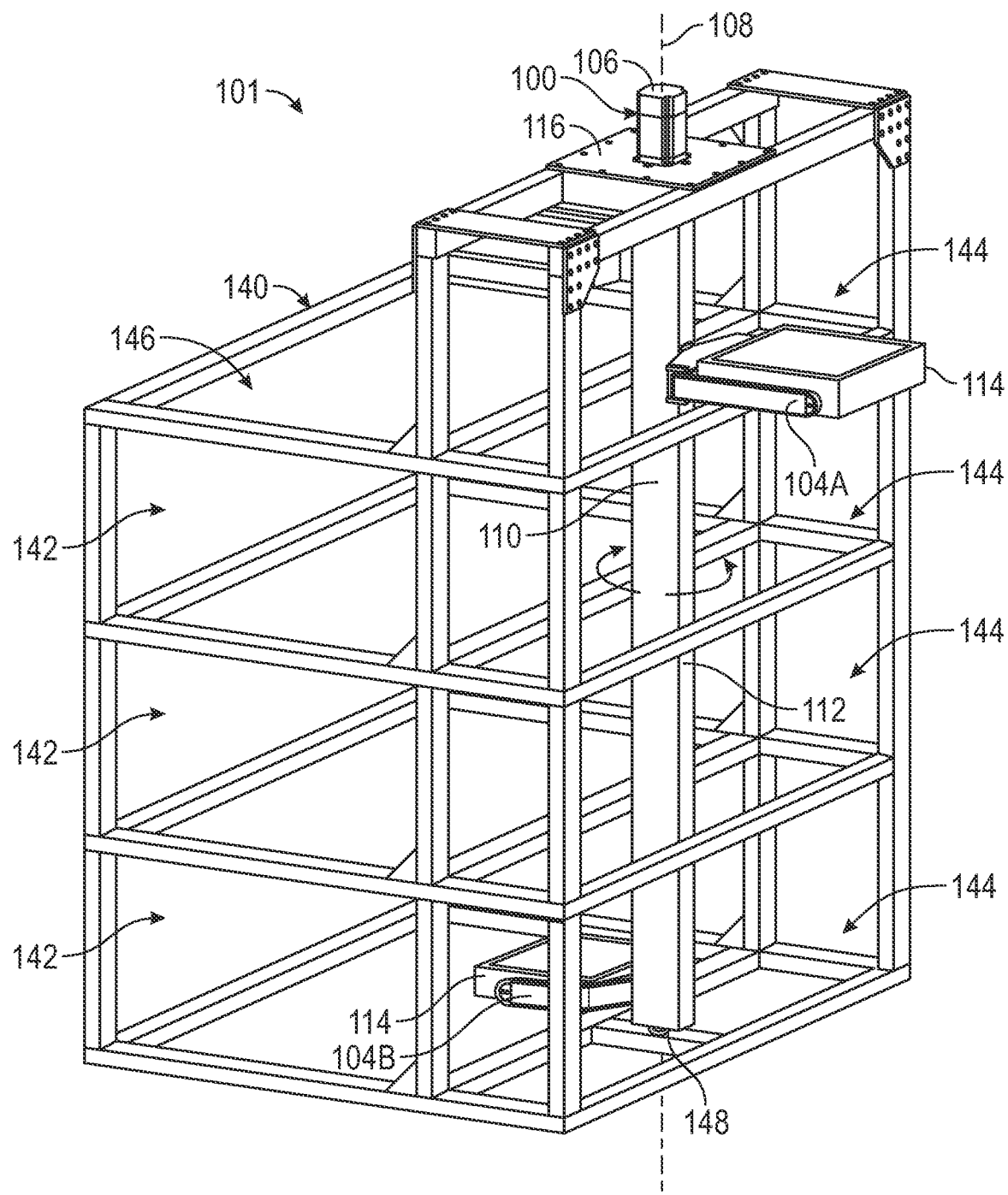
FIG. 1C is a conveying system, according to one embodiment.

The rotary actuator 106 attaches to a mount plate 116 configured to connect the transport device 100 to a support structure as discussed in relation to FIG. 1C. The mount plate 116 fixes the rotary actuator 106 while the shaft 110 rotates. The shaft 110 may further comprise a rotation pin 118 (see FIG. 1A) disposed on the shared axis of rotation 108 at an end opposite the rotary actuator 106. The rotation pin 118 may interface with a corresponding collar (not shown) to form a pin joint configured to assist rotation as discussed in relation to FIG. 1C.

In the depicted embodiment, each carrier 104A and 104B is positioned at a fixed angle from other carriers in relation to the shared axis of rotation 108. For example, the carriers 104 may comprise only two carriers 104A and 104B positioned an angle θ apart, such as 180 degrees, in relation to the shared axis of rotation 108. As shown, the two carriers 104A and 104B are disposed on opposite sides of the shaft 110.

The carriers 104 may grasp the articles 114 through different means and may include a gripper or claw. As shown in FIG. 1A, the carriers 104 comprise arms 105A having grips 105B configured to grip the article 114. For example, the grips 105B may be made of a slip-resistant or anti-slip material. The arms 105A attach to a body 105C, which may contain an opening actuator (not shown) configured to open and close the arms 105A of the carriers 104. For example, the arms 105A may rotate outward from the article 114 when releasing and toward the article 114 when grasping. In some embodiments, other means of grasping may be used. The arms 105A may use self-centering springs, electromagnetism, or electrostatic adhesion to grasp the article 114. In some embodiments, the opening actuator may be a mechanical, an electromechanical, a hydraulic, a pneumatic, or a piezoelectric actuator. In some embodiments, the carriers 104 may be soft grippers that include an outer skin made of rubber or similar material. In one embodiment, the gripper fingers may include surface features that enhance the ability for the grippers to grab the article 114. In some embodiments, the carriers 104 may be a conveyor belt that items can be loaded onto and ejected from. In some embodiments, the carriers 104 and/or the articles 114 may comprise a self-leveling apparatus to ensure the articles 114 are level as described in FIG. 5B.

In some embodiments, the carriers 104 may be actuated and rotated at the same time. For example, the rotary actuator 106 (see FIG. 1C) may rotate the carriers 104 while the linear actuators 102 move the carriers 104 vertically.

In some embodiments, the transport device 100 does not have a rotation pin 118. For example, the rotary actuator 106 may rotate the shaft 110 as the shaft 110 is suspended in space. In some embodiments, a ball-and-socket joint or connection comprising bearings may be used to assist rotation.

In some embodiments, the fixed angle θ between the carrier 104A and 104B may be more or less than 180 degrees. For example, the carriers 104 may be positioned 120 degrees or 90 degrees apart. In some embodiments, such as discussed in relation to FIG. 4, the fixed angle θ may be based on the number of carriers 104.

FIG. 1B is a cross-sectional view of the transport device 100 from FIG. 1A, according to one embodiment. In particular, FIG. 1B shows one embodiment of the linear actuators 102 as a belt-drive actuator. The articles 114 are omitted for illustrative purposes.

In the depicted embodiment, each linear actuator 102 comprises an actuator 120 connected to a drive pulley 122. The actuator 120 and drive pulley 122 are disposed at a first end 111A of the shaft 110. A guide pulley 124 is disposed at a second end 111B of the shaft 110 opposite the first end 111A. A belt 126 (or chain) wraps around and connects the pulleys 122 and 124. Each carrier 104A and 104B connects to the belt 126 of a respective linear actuator 102 through a carrier connector 128. In some embodiments, the carrier connector 128 is part of the carrier 104. In some embodiments, the carrier connector 128 is a separate part configured to secure the carrier 104 to the belt 126.

The actuator 120 moves each carrier 104A and 104B vertically by rotating the drive pulley 122 and moving the belt 126. The belt 126 moves the carrier 104 and the track 112 guides the carrier 104 as it moves. As shown, each linear actuator 102 is parallel to other linear actuators 102.

In some embodiments, the linear actuators 102 may be configured differently. For example, the drive pulley 122 may comprise a textured or pattern surface where the drive pulley 122 engages the belt 126. The belt 126 may comprise a textured or pattern surface to engage the drive pulley 122 (e.g. a chain and sprocket system). In some embodiments, the linear actuators 102 may be a different type of mechanical or electromechanical actuator such as a ball screw, roller screw, or lead screw designs driven actuator. In some embodiments, the linear actuators 102 may be hydraulic, pneumatic, or piezoelectric actuators.

FIG. 1C is a conveying system 101, according to one embodiment. In the depicted embodiment, the conveying system 101 comprises the transport device 100. The conveying system 101 further comprises a support structure 140. A right side of the support structure 140 (as shown on the page) is omitted for illustrative purposes but mirrors the left side such as shown in FIG. 2.

The transport device 100 may attach to the support structure 140 through the mount plate 116, which engages the support structure 140 to constrain the rotary actuator 106 and transfer rotation to the shaft 110. The transport device 100 may further rotatably couple to the support structure 140 through a collar 148, which engages the rotation pin 118 of the shaft discussed in relation to FIG. 1A.

Figure 2:
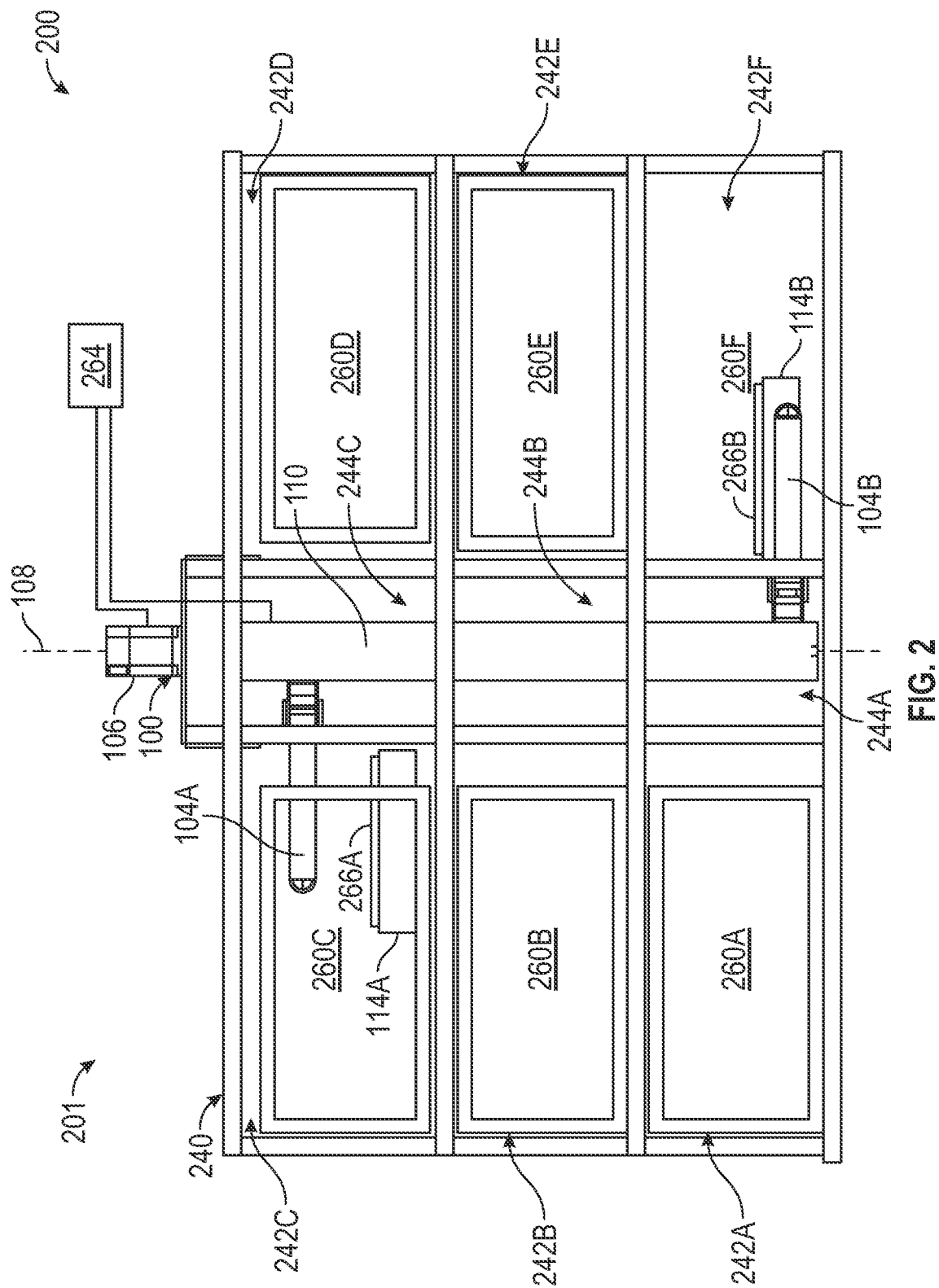
FIG. 2 is a side view of a digital printing environment, according to one embodiment.

The conveying system 101 comprises a plurality of processing modules (e.g., processing modules 260), which are further discussed in relation to FIG. 2. The support structure 140 comprises a plurality of processing spaces 142 and a plurality of transition spaces 144. Each processing space 142A-F of the processing spaces 142 contains a processing module of the processing modules 260. The transition spaces 144 are positioned in between the processing spaces 142 on a left and right side of the support structure 140 (as shown on the paper). The transport device 100 is disposed in the transition spaces 144 and configured to move the articles 114 between processing spaces 142, through the support structure 140, and to the processing modules. For example, the carriers 104 may grasp the articles 114 from the processing spaces 142 as shown in FIG. 1C. The carriers 104 may rotate the articles 114 about the shared axis of rotation 108, for example, 90 degrees into the transition spaces 144 and move the articles 114 vertically through the transition spaces 144. The carriers 104 may further rotate 90 degrees to place the articles 114 into different processing spaces 142.

The rotary actuator 106 may rotate the shaft 110 clockwise or counter-clockwise. For example, the rotary actuator 106 may rotate the shaft 110 clockwise until the carriers 104 are in the transition spaces 144 and then clockwise again to move the carriers 104 into respective processing spaces 142, or counter-clockwise until the carriers 104 are in the transition spaces 144 and then counter-clockwise again to move the carriers 104 into respective processing spaces 142 such that the article 114 may start on the left side and be moved to the right side. The rotary actuator 106 may rotate the shaft 110 clockwise and then counter-clockwise such that the article 114 starts and remains on the same side. Thus, the direction of rotation may be determined based upon initial and destination processing spaces 142.

As shown in FIG. 1C, the support structure 140 includes a module shelf 146 on top of the highest processing space 142. The module shelf 146 may be used as a staging area for holding an article 114 or presenting an article 114 for inspection. In some embodiments, the module shelf 146 may be used to hold or locate a process module.

FIG. 2 is a side view of a digital printing environment 200, according to one embodiment. The digital printing environment 200 comprises a conveying system 201 similar to the conveying system 101 of FIG. 1C, except a module shelf 146 is not shown in the depicted embodiment.

The conveying system 201 includes the support structure 240 (a portion of which was illustrated by the support structure 140 in FIG. 1C) and a transport device 100. In particular, FIG. 2 shows a plurality of processing modules 260 disposed in a support structure 240. The support structure 240 includes a plurality of processing spaces 242 (e.g. 242A-C) and transition spaces 244 (e.g. 244A-C) similar to the support structure 140. The processing modules 260 are disposed within the processing spaces 242 and may contain different processes to be performed on the plurality of articles 114 or items on the articles 114. For example, a processing module 260A is disposed within the processing space 242A. A processing module 260B is disposed within the processing space 242B, and so forth. The processing modules 260 may contain different stages of a garment processing system such as at least one of a retrieval, pretreatment, printing, embroider, curing, drying, or holding module.

The conveying system 201 is configured to move the articles 114 from a plurality of initial modules of the processing modules 260 to a plurality of destination modules of the processing modules 260. In some embodiments, each article (e.g., an article 114A and an article 114B) of the articles 114 may be in a separate initial module and be moved to a separate destination module. In the depicted embodiment, a processing space 242F is an entry module 260F configured to accept the article 114B placed by a user. The article 114B may contain a garment 266B, such as a shirt, to be customized through printing operations and may be moved to different processing modules 260 by the conveying system 201. For example, the carrier 104B may move the article 114B to a preprocessing module contained in the processing module 260B. As further depicted, the article 114A contains a garment 266A and is in a processing module 260C, which may contain a printing stage. The carrier 104A is shown positioned above the article 114A and may have just released the article 114A, may be about to grasp the article 114A, or may be waiting while the garment 266A is finished being processed. The carrier 104A may grasp the article 114A and move it to another processing module 260 such as a processing module 260D, which may contain a drying stage. Thus, as shown, the processing modules 260C and 260F are initial modules and the processing modules 260D and 260B are destination modules.

In some embodiments, each processing module 260 may include a bottom surface that forms a closed box when the article 114 or the carrier 104 and the article 114 is in place. In some embodiments, each processing space 242 may be open with no doors or bottom plate. For example, the processing spaces 242 may contain different stages of a garment processing system.

The conveying system 201 may use the rotary actuator 106 to rotate the shaft 110 and the carriers 104 about a shared axis of rotation 108 after grasping the articles 114 from the initial modules 260C and 260F. For example, the carriers 104A and 104B may each be rotated 90 degrees clockwise into transitional spaces 244C and 244A, respectively. The carriers 104 may be moved vertically along the shaft 110 to a location adjacent to the destination modules 260B and 260D. The rotary actuator 106 may rotate the shaft 110 and the carriers 104 about the shared axis of rotation 108 to place the articles 114 in the destination modules 260C and 260F. For example, the carriers 104A and 104B may each be rotated 90 degrees clockwise into transitional spaces 244C and 244A, respectively. Thus, the transition spaces 244 are used to as a throughway to move the articles 114 between the processing modules 260.

In another example, the article 114A may be undergoing the printing process when the article 114B is moved. The carrier 104A may be rotated without the article 114A when the carrier 104B is rotated, and the carrier 104A may be moved to a different processing module 260 to move a different article (not shown) while the article 114A is processed. In another example, during processing, the carrier 104 may move the articles 114 by different amounts. For example, the carrier 104A may move vertically one module and the carrier 104B may move vertically three modules.

A controller 264 is configured to control the rotation of the rotary actuator 106 and the actuation of the carriers 104. The controller 264 may accept information from a user interface (not shown), such as information on how the garments 266A and 266B are to be processed, to determine what processing modules 260 are used and to determine how to move the corresponding article 114.

In some embodiments, the carriers 104 may include an actuator configured to push or pull the articles 114 off or on the carriers 104 and into the processing spaces 142 or processing modules 260. For example, the actuator may push the article 114A off the carrier 104A in a plane that is roughly parallel to the carrier 104 and place the article in the processing module 260C. In some embodiments, the processing modules 260 may include an actuator to push or pull the articles 114 on or off the carriers 104. For example, the processing module 260C may include the actuator to pull the article 114A off the carrier 104A in a plane that is roughly parallel to the carrier 104. In some embodiments, the carriers 104 and the processing modules 260 may have an actuator to push platens off their respective area. For example, the carrier 104A may have an actuator to push the article 114A into the processing module 260C for processing. The processing module 260C may have an actuator to push the article 114A onto a carrier 104 (e.g., 104A) after processing the article 114A.

In some embodiments, the articles 114 comprise at least one of a platen, a tray, a jig, a fixture, a material to be processed, a container, or a package. In some embodiments, the process modules 260 may be holding modules and the articles 114 may be objects to be stored (e.g., if the conveying system 201 is used as a shipping warehouse). The conveying system 201 may be used to store and retrieve the stored objects.

Figure 5A:
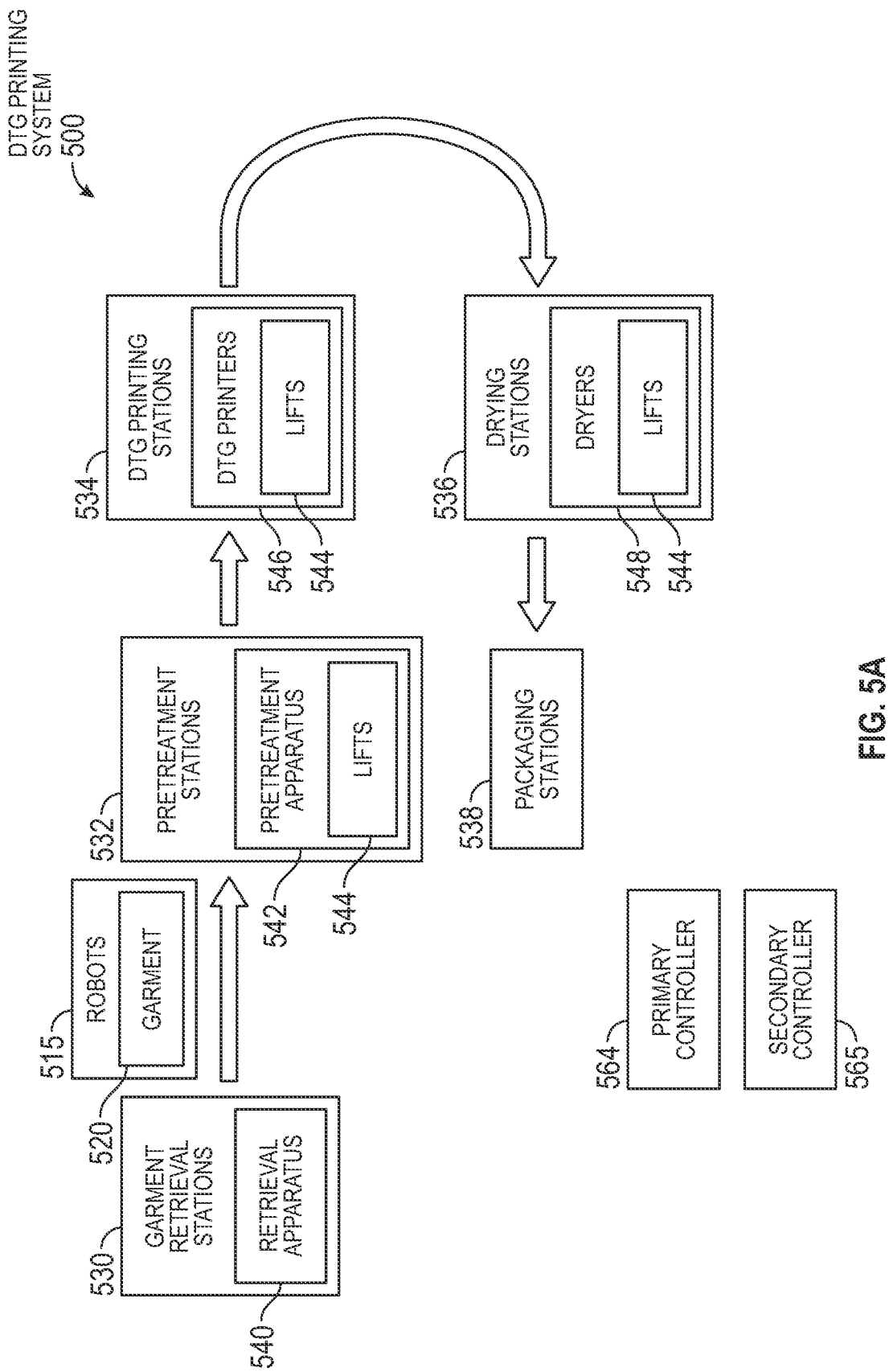
FIG. 5A is a block diagram of a direct-to-garment printing environment, according to one embodiment.
Figure 5B:
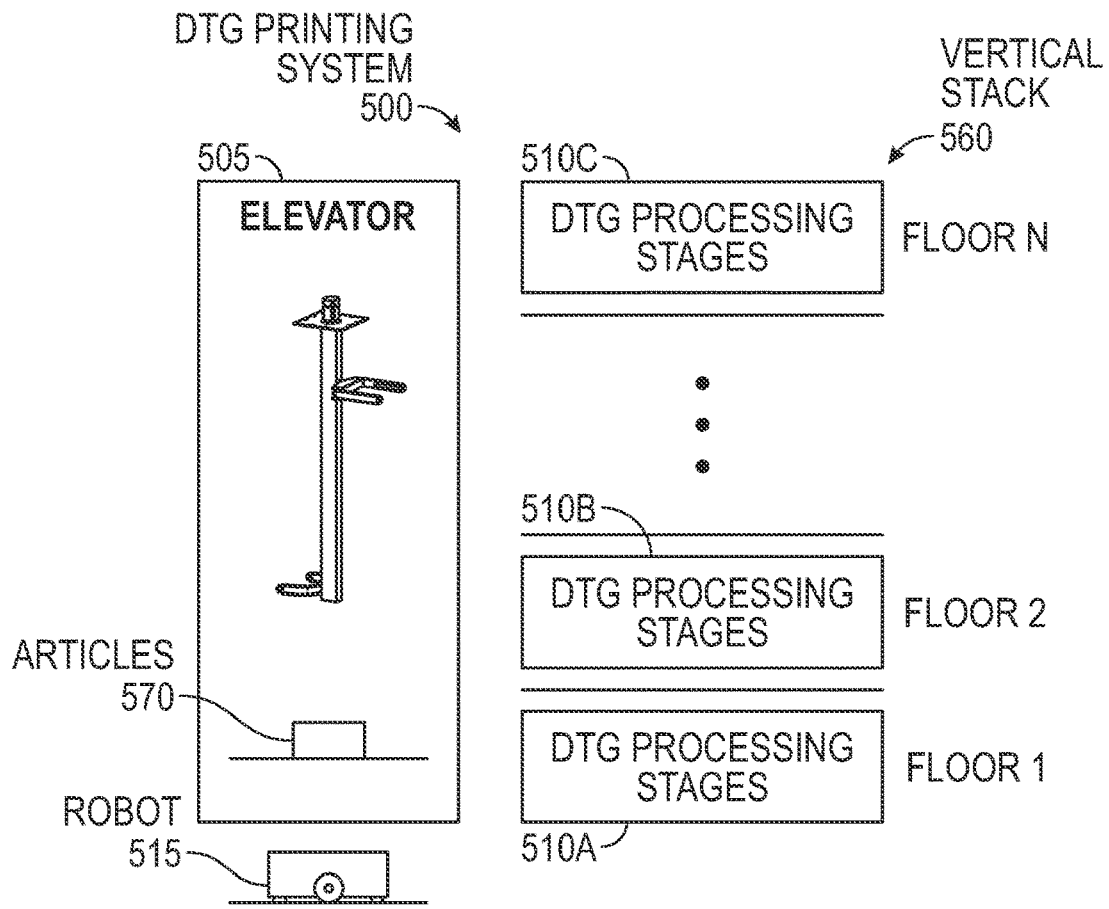
FIG. 5B illustrates disposing direct-to-garment processing stages above one another, according to one embodiment.

In some embodiments, the article 114B may be placed in the entry module 260F (see FIG. 3A) by a robot or some other automated means, such as discussed in relation to FIGS. 5A and 5B.

Although three vertical layers are shown, other embodiments of the digital printing environment 200 may use more or less layers. For example, the support structure 240 may include another processing space 242 above the processing spaces 242C and 242D and a height of the transport device 100 would increase accordingly. Thus, the digital printing environment 200 is scalable and modular such that the amount of process modules 260 stacked on top of another in the conveying system 201 may be increased or decreased. The scalability beneficially allows the digital printing environment 200 to be customized to accommodate different processing modules 260 and/or different amounts of articles 114 to be processed in the conveying system 201.

In some embodiments, the processing modules 260 may be customized upon setup of the conveying system 201. In some embodiments, the processing modules 260 may be changed or reconfigured to different processes. Thus, the processing modules 260 are modular and may be changed to meet requirements of the digital printing environment 200.

Example Agglomerated Conveying Systems

Figure 3A:
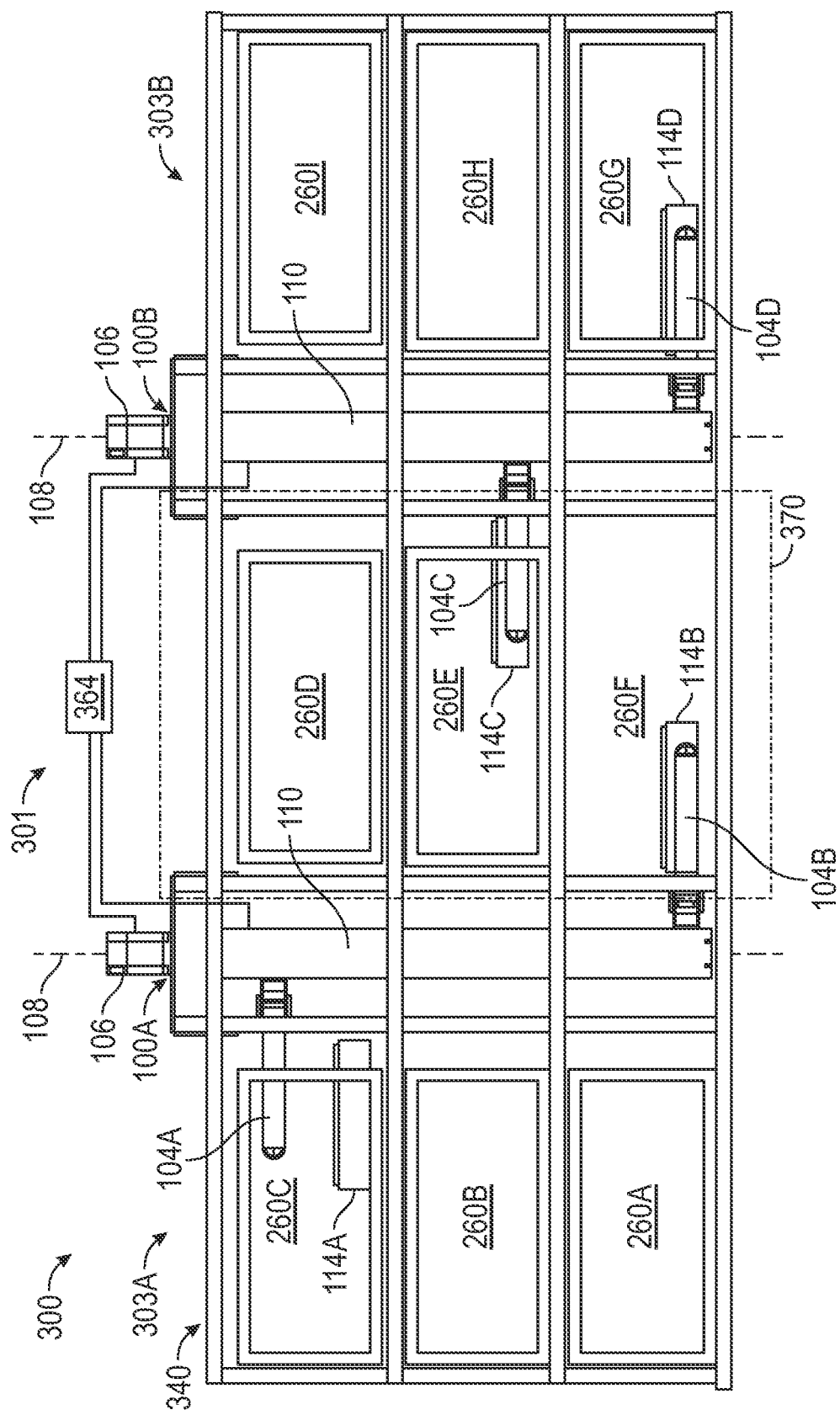
FIGS. 3A and 3B are side and top views, respectively, of a digital printing environment, according to one embodiment.
Figure 3B:
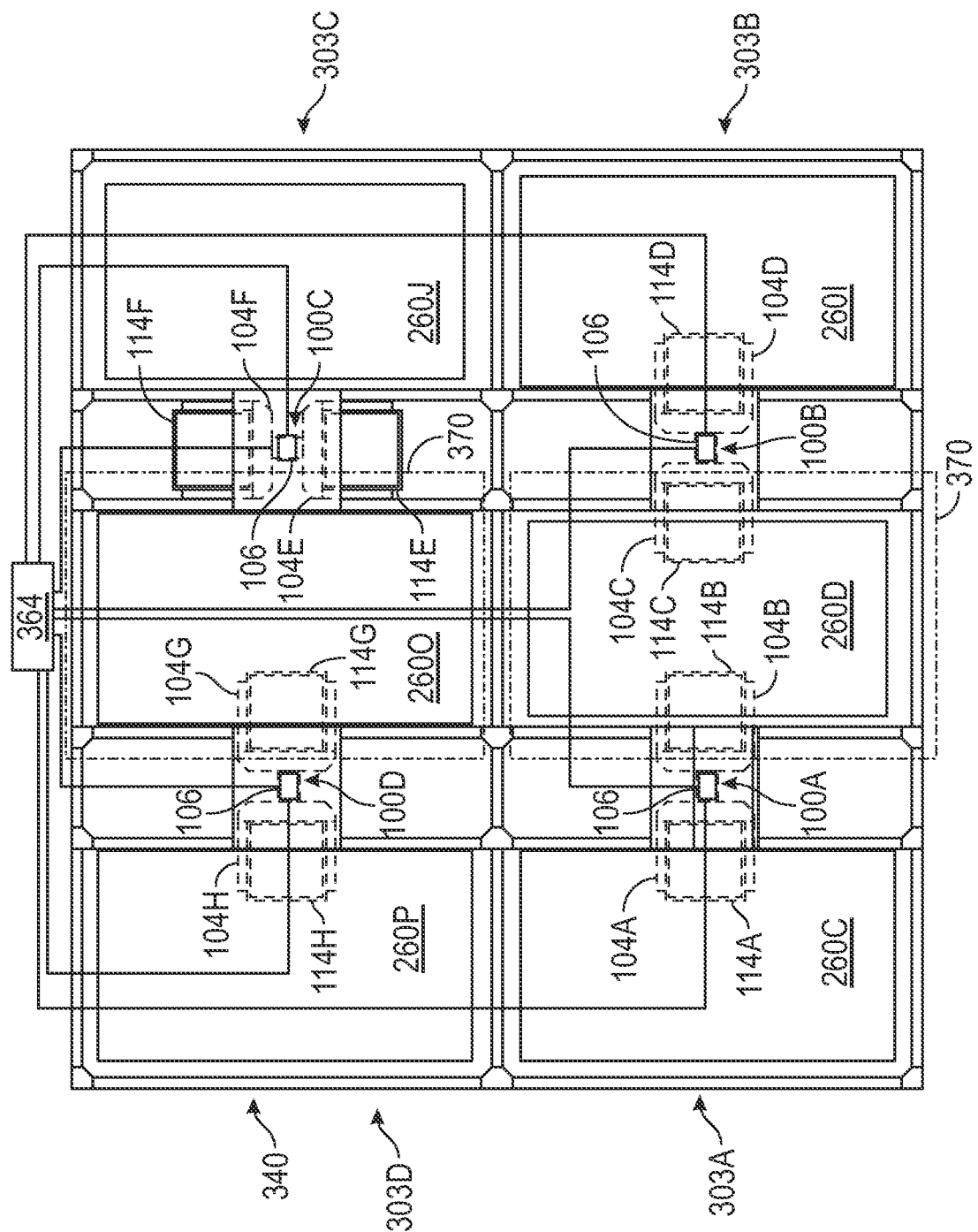

FIGS. 3A and 3B are side and top views, respectively, of a digital printing environment 300, according to one embodiment. The digital printing environment 300 is a scaled-up version of the digital printing environment 200.

The digital printing environment 300 comprises an agglomerated system 301, which comprises a support structure 340, a plurality of conveying systems 303, and a plurality of transport devices 100. The conveying systems 303 may be used to move a plurality of articles 114 simultaneously. In the depicted embodiment of FIGS. 3A and 3B, each conveying system 303A-D comprises a transport device 100A-D. The conveying systems 303 further comprise a plurality of processing modules 260.

In the depicted environment, each respective conveying system 303A-D of the conveying systems 303 is connected to another conveying system 303A-D of the conveying systems 303 via an interface 370 between the respective conveying system and the another conveying system. The conveying system 303A is connected to the conveying system 303B through the interface 370. The interface 370 may comprise at least one processing module 260 shared between the respective conveying system 303A and the another conveying system 303B. For example, the processing modules 260D-F may be shared between the conveying systems 303A and 303B. The carriers 104A and 104B of the respective conveying system 303A and the carriers 104C and 104D of the another conveying system 303B may each access at least one processing module 260D-F shared between the respective conveying system 303A and the another conveying system 303B. As shown in the depicted embodiment, a processing module 260F is an entry module shared between the conveying systems 303A and 303B.

In some embodiments, the shared processing modules 260D-F allow the transport devices 100 to use common processing modules 260, which may reduce a footprint of the digital printing environment 300. In some embodiments, the shared processing modules 260D-F allow the transport devices 100 to move an article 114 between the conveying systems 303. For example, a processing module 260E may be a holding module and a carrier 104C may place an article 114C in the holding module 260E for a carrier 104B to retrieve.

The agglomerated system 301 may further include a controller 364 configured to control movement of the articles 114, similar to the controller 264. The controller 364 may further coordinate movement of the articles 114 through the processing modules 260. In some embodiments, the process modules 260 may contain more than one of each process. For example, printing may take more time than other modules and the processing modules 260C, 260D, and 260I may each be a printing module to allow more bandwidth for printing. The controller 364 may coordinate processing through the multiple printing modules 260C, 260D, and 260I to beneficially prevent a stoppage of processing of the articles 114 during processing.

Figure 3C:
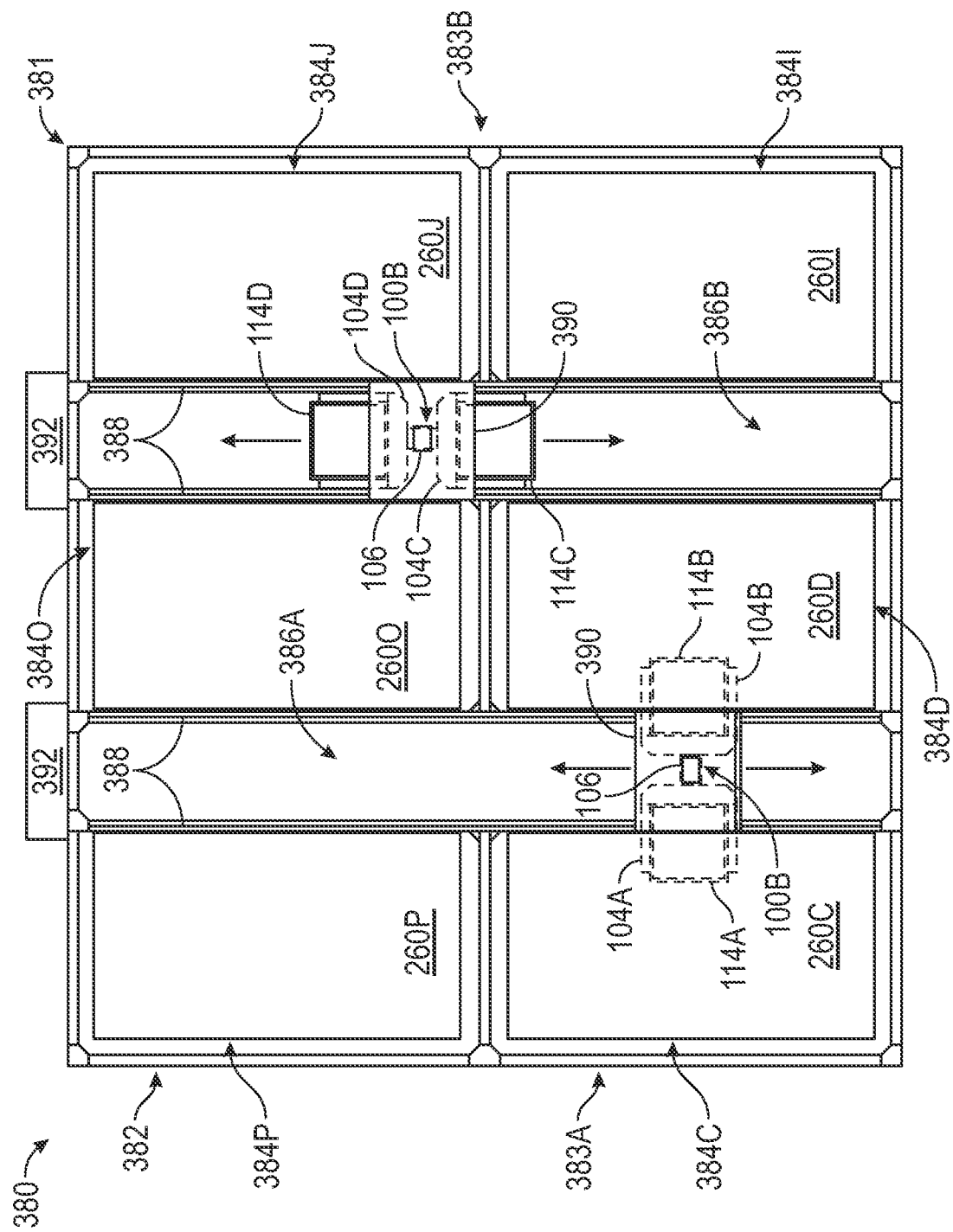
FIG. 3C is a top view of a digital printing environment, according to one embodiment.

FIG. 3C is a top view of a digital printing environment 380, according to one embodiment. The digital printing environment 380 is similar to the digital printing environment 300, except as noted.

The digital printing environment 380 comprises an agglomerated system 381, which comprises a support structure 382, a plurality of conveying systems 383, and a plurality of transport devices 100. The support structure 382 includes a plurality of processing spaces 384, a plurality of transition spaces 386, and a plurality of tracks 388. The conveying systems 383 may be used to move a plurality of articles 114 simultaneously.

In the depicted embodiment, each conveying system 383A and 383B comprises a transport device 100A or 100B, respectively. The rotary actuator 106 attaches to a mount plate 390 configured to connect each transport device 100A and 100B to the tracks 388 of the support structure 382. A translation system 392 attaches to the mount plate 390 and moves the transport devices 100 along the tracks 388. The translation system 392 may be a linear actuator similar to the linear actuator 102. In some embodiments, the translation system 392 may be a belt and pulley system or a chain and sprocket system, or a combination of one or more translation systems configured to pull the transport devices 100 along the tracks 388. In some embodiments, the translation system 392 may be an actuator mounted to the mount plate 390 or the transport devices 100 that engages the tracks 388 to move the transport devices 100. For example, the tracks 388 may comprise a rack and the translation system 392 may comprise a pinion.

The agglomerated system 381 further comprises a plurality of processing modules 260 disposed in the processing spaces 384 of the support structure 382. The processing modules 260 are stacked on top of one another inside the support structure 382 as previously described in relation to the support structure 340. Thus, the processing modules 260 are grouped in vertical stacks (only the top processing modules 260 of the vertical stack are shown). The transport devices 100 may travel between the vertical stacks, where the carriers 104 may grasp or place an article 114 in one of the processing modules 260.

At least one processing module 260 may be shared between the conveying systems 383A and 383B. For example, the carriers 104A and 104B of the conveying system 383A and the carriers 104C and 104D of the conveying system 383B may each access the processing modules 260D and 260O. The shared processing modules 260 allow the carriers 104 to move the articles 114 to any of the processing modules 260. Thus, the translation system 392 allows each individual transport device 100 of the agglomerated system 381 to access more processing modules 260 than each individual transport device 100 of the agglomerated system 301. The access to more processing modules 260 beneficially reduces the amount of transport devices 100 needed.

Although the depicted embodiment shows only two rows or vertical stacks, other embodiments of the agglomerated system 381 may be scaled to have more rows. The translation system 392 may be scaled accordingly to move the transport devices 100 travel to the additional rows of vertical stacks, which beneficially avoids the need to add transport devices 100.

Example Conveying System with More than Two Carriers

Figure 4:
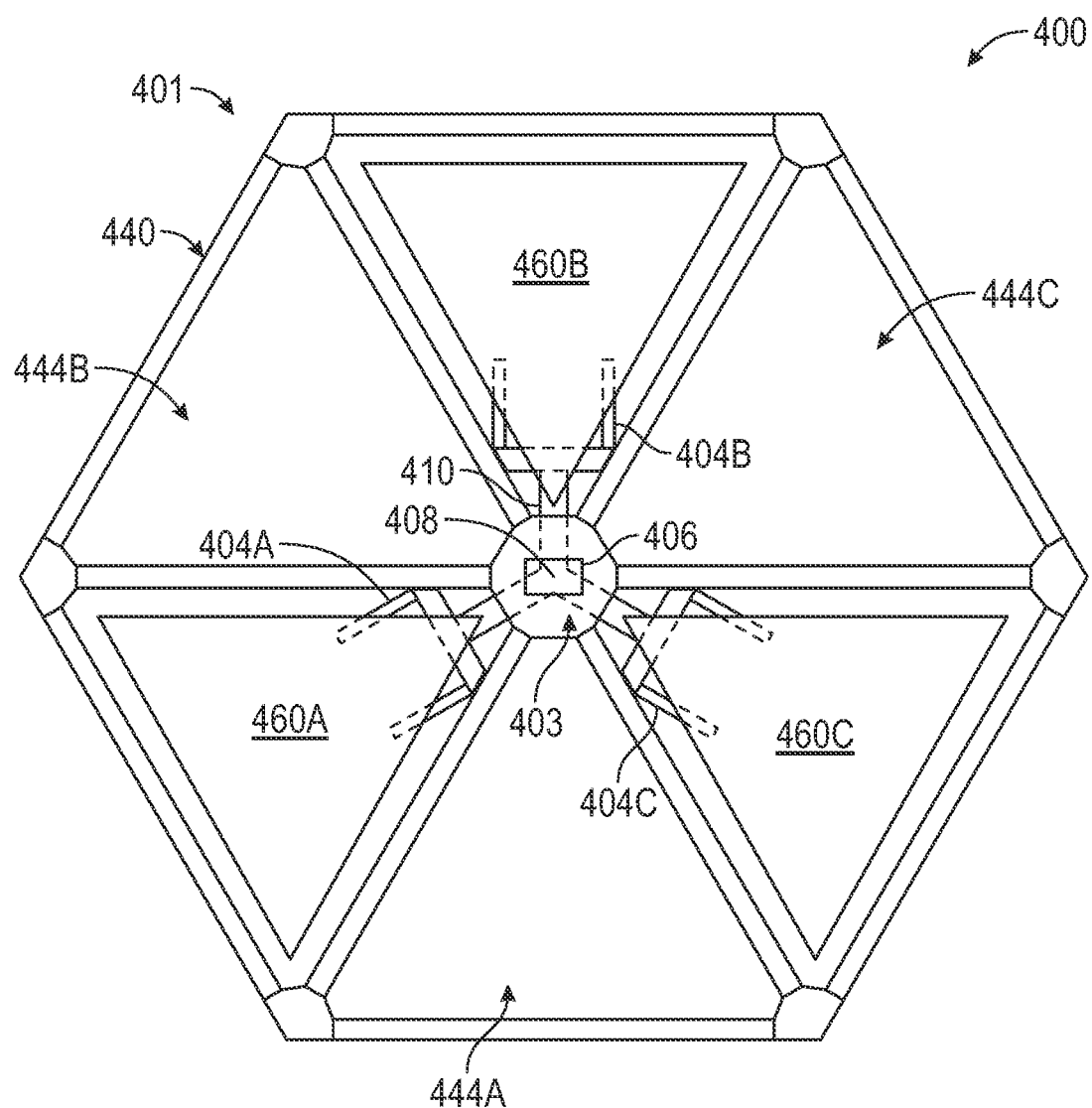
FIG. 4 is a top view of a digital printing environment, according to one embodiment.

FIG. 4 is a top view of a digital printing environment 400, according to one embodiment. In particular, the digital printing environment 400 includes a conveying system 401 having a support structure 440 and a transport device 403 having a shaft 410 and three carriers 404. Each carrier 404A, 404B, and 404C of the three carriers 404 is positioned less than 180 degrees apart from other carriers of the three carriers 404 in relation to a shared axis of rotation 408. In the depicted embodiment, the carrier 404A is positioned about 120 degrees from the carriers 404B and 404C and the carrier 404B is positioned about 120 degrees from the carrier 404C.

The conveying system 401 functions similarly to the conveying system 201 discussed in relation to FIG. 2. For example, the carriers 404 may grasp and move articles (not shown) between the processing modules 460. The carriers 404 may move vertically (in and out of the page) through transition spaces 444 of the support structure 440 to reach different levels of the conveying system 401. A rotary actuator 406 may rotate the transport device 403 clockwise, counter-clockwise, or both, to move the articles in and out of the processing modules 460 and in and out of the transition spaces 444. For example, the rotary actuator 406 may rotate the shaft 410 about 60 degrees, 180 degrees, or 300 degrees to position the carriers 404 in the processing modules 460 or the transition spaces 444.

The conveying system may require a lesser footprint per total processing modules 460 than the conveying system 201 discussed in relation to FIG. 2. For example, the shape of the support structure 440 accommodates more processing modules 460 per level than the conveying system 201. Thus, the conveying system 401 may be useful where a higher density of processing modules 460 is desired.

In some embodiments, the angles between the carriers 404 may be unequal. In some embodiments, there may be more than three carriers 404. In some embodiments, an angle between a first and second carrier 404 may be 90 degrees and an angle between a second and third carrier 404 may be 90 degrees.

The concepts and systems discussed in relation to FIGS. 1-4 are not meant to be limiting. The printing environments discussed herein may use conveying systems that are configured differently than previously described. For example, the design and shape of the support structures and the process modules may differ to accommodate different processing requirements. Accordingly, the transport devices may vary. Different carrier designs and different actuation mechanisms may be used, and the amount of carriers may vary per the concepts described herein.

Example Implementation of a Conveying System in a Digital Printing Environment

FIG. 5A is a block diagram of a direct-to-garment (DTG) printing system 500, according to one embodiment. U.S. patent application Ser. No. 17/364,694, filed Jun. 30, 2021 entitled "GARMENT PERSONALIZATION WITH AUTONOMOUS ROBOTS" (referred to as "the '694 application") describes a digital printing environment, such as a DTG printing system 500, that uses automation and parallel operation to process garments between processing stages as described herein and is incorporated herein by reference in its entirety. However, in some embodiments, the transport device 100 discussed in relation to FIG. 1A can also be used to move the garments 520 between some stations, or between different locations in the same station. For example, the DTG printing system 500 may comprise the agglomerated system 301 having multiple transport devices as discussed in relation to FIGS. 3A-3C. Thus, the discussion on operation of the robots 515 may also relate to the transport device 100.

The DTG printing system 500 includes a primary controller 564 and a secondary controller 565 for controlling the movement of the robots 515 through the environment. In some embodiments, the controllers may be either one or combination of the controllers 264 or 364 discussed in relation to FIGS. 2 and 3A. The stations include garment retrieval stations 530, pretreatment stations 532, DTG printing stations 534, drying stations 536, and packaging stations 538. The garment retrieval station 530 includes a retrieval apparatus 540 that can mount the garment 520 onto a respective robot 515. In some embodiments, the retrieval apparatus 540 may be an actuator configured to push or pull the garment 520 off or on the robots 515, similar to the actuator discussed in relation to FIG. 2.

The pretreatment station 532 may include a pretreatment apparatus 542 for applying a pretreatment solution to the garment 520. The pretreatment apparatus 542 includes a lift 544 for raising and leveling the garment 520. In some embodiments, the lift 544 may comprise the transport device 100. The DTG printing stations 534 includes DTG printers 546 to print images on the garments 520. The DTG printers 546 can include respective lifts 544 for aligning the garments 520 carried by the robots 515 with the printhead of the DTG printers 546. The drying stations 536 comprise dryers 548 to help cure the wet-on-wet DTG printing process. At the packaging stations 538, the garments 520 are removed from the robot 515, folded, and placed in containers (e.g., boxes or padded envelopes) to be shipped.

Although the DTG printing system 500 is described as moving garments 520, in some embodiments, the DTG printing system 500 may move articles, such as the articles 114 described in relation to FIGS. 2-3. In some embodiments, the garments 520 may be the garments 266.

FIG. 5B illustrates disposing DTG processing stages above one another, according to one embodiment. In particular, FIG. 5B illustrates an embodiment of the DTG printing system 590 comprising a conveying system, similar to the conveying system 201 discussed in relation to FIG. 2.

The DTG printing system 590 includes multiple DTG processing stages 510 located on different floors of a warehouse, which may be referred to as a vertical stack 560. In some embodiments, each processing stage 510 may comprise one of the stations 530, 532, 534, 536, and 538 or other components discussed in relation to FIG. 5A. As shown, the DTG processing stages 510A are located on Floor 1, the DTG processing stages 510B are located on Floor 2, and the DTG processing stages 510C are located on Floor N. In one embodiment, the types of DTG processing stages 510 on a particular floor may all be the same. For example, the DTG processing stages 510A may be pretreatment apparatuses (e.g., the pretreatment apparatus 542), while the DTG processing stages 510B are DTG printers (e.g., the DTG printer 546) and the DTG processing stages 510C are dryers (e.g., dryers 548). Alternatively, the floors may have multiple types of DTG processing stages. For example, the DTG processing stages 510 may include garment retrieval apparatuses (e.g., the retrieval apparatus 540) while the DTG processing stages 510B include pretreatment apparatuses, DTG printers, and dryers, and the DTG processing stages 510C include folding and packaging apparatuses.

The DTG printing system 590 includes an elevator 505, similar to any of the previously described transport devices, for moving a robot 515 holding the garment between the various floors. For example, each carrier 104 of the transport device 100 may grasp the robot 515. By separating the DTG processing stages onto different floors, the overall footprint of the warehouse containing the DTG printing system 590 can be reduced.

The elevator 505 can move the garment between the processing stages 510. However, instead of moving the robot 515, the elevator 505 may move articles 570 holding the garment, similar to the articles 114 in FIG. 2. That is, the elevator 505 may have a machine that removes the articles 570 from the robot 515 and moves the articles 570 between the different DTG processing stages 510. Thus, the term elevator can include an apparatus that lifts only a platen as well as an apparatus that lifts both the platen and the robot 515 together. The processing stages 510 may have conveyor belts or tracks for removing the articles 570 from the elevator 505. Once the garment is processed, the processing stages 510 move each article 570 back into the elevator 505 so the garment can be moved to the next processing stage 510 in the vertical stack 560. Once the garment is processed through all the stages 510, the elevator can move the articles 570 back onto the robot 515 using a lifting apparatus.

In some embodiments, such as embodiments where the elevator 505 is the transport device 100, the carriers 104 (see FIG. 2) may include a self-leveling apparatus. The self-leveling apparatus can level the article 114 (see FIG. 2), thereby compensating for unevenness in the floor or manufacturing tolerances of the transport device 100. The leveling apparatus beneficially ensures the article 114 is level while the article 114 is processed. The self-leveling apparatus may use guides, arms, supporting features and V-blocks as described in FIGS. 6A-6F of the '694 application. In some embodiments, the self-leveling apparatus may comprise the carrier 104 and the article 114. In some embodiments, the self-leveling apparatus may comprise the processing space 142 or the processing module 260 and the carrier 104.

In addition to the vertical stack 560, the DTG printing system 590 may include other processing stages that are not arranged in a vertical stack 560. For example, the garment retrieval stations and the packaging stations may not be in vertical stack 560 with other DTG processing stages.

In some embodiments, the DTG processing stages 510 of the vertical stack 560 are arranged on the same floor, rather than different floors. For example, the DTG processing stage 510A may be a pretreatment apparatus while the DTG processing stage 510B is a DTG printer and the DTG processing stage 510C is a dryer. Any kind of support structure can be used to form the vertical stack of the processing stages 510.

Example Kiosk Containing a Conveying System of a Digital Printing Environment

Figure 6:
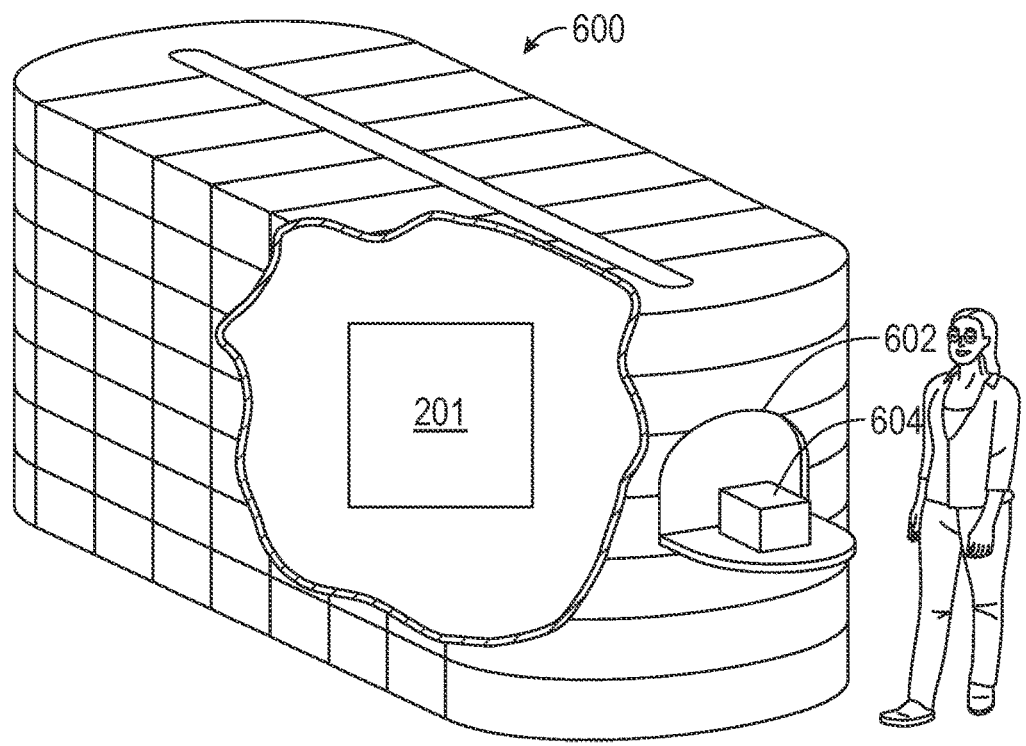
FIG. 6 is a kiosk containing a digital printing environment, according to one embodiment.

FIG. 6 is a kiosk 600 containing a digital printing environment, according to one embodiment. U.S. patent application Ser. No. 17/232,089, filed Apr. 15, 2021 and entitled "PERSONALIZATION VENDING KIOSK" describes a kiosk system for personalizing articles as described herein and is incorporated herein by reference in its entirety.

In the depicted embodiment, the kiosk 600 is a personalization kiosk 600. The kiosk 600 may comprise a window 602 into the housing. In response to receiving a personalization order, a control system, such as the controller 264 discussed in relation to FIG. 2, may cause the conveying system 201 to transfer an article 604 from within the kiosk 600 to the window 602 for a user to receive. The window 602 may provide an entryway for the entry module 260F (not shown) of the conveying system 201.

Although the kiosk 600 is discussed as including the conveying system 201, other embodiments may include a different conveying system, such as at least one of the conveying systems 101, 301, or 401.

In some embodiments, the user may place the article 604 within the window 602 and the conveying system 201 of the personalization kiosk 600 may transfer the article within the kiosk to be personalized according to the personalization order.

In some embodiments, the kiosk 600 may be a storage kiosk used to store and retrieve articles 604. The conveying system 201 of the storage kiosk may move the articles 604 in a similar manner to the kiosk 600.

Example Method for Moving a Plurality of Articles Simultaneously

Figure 7:
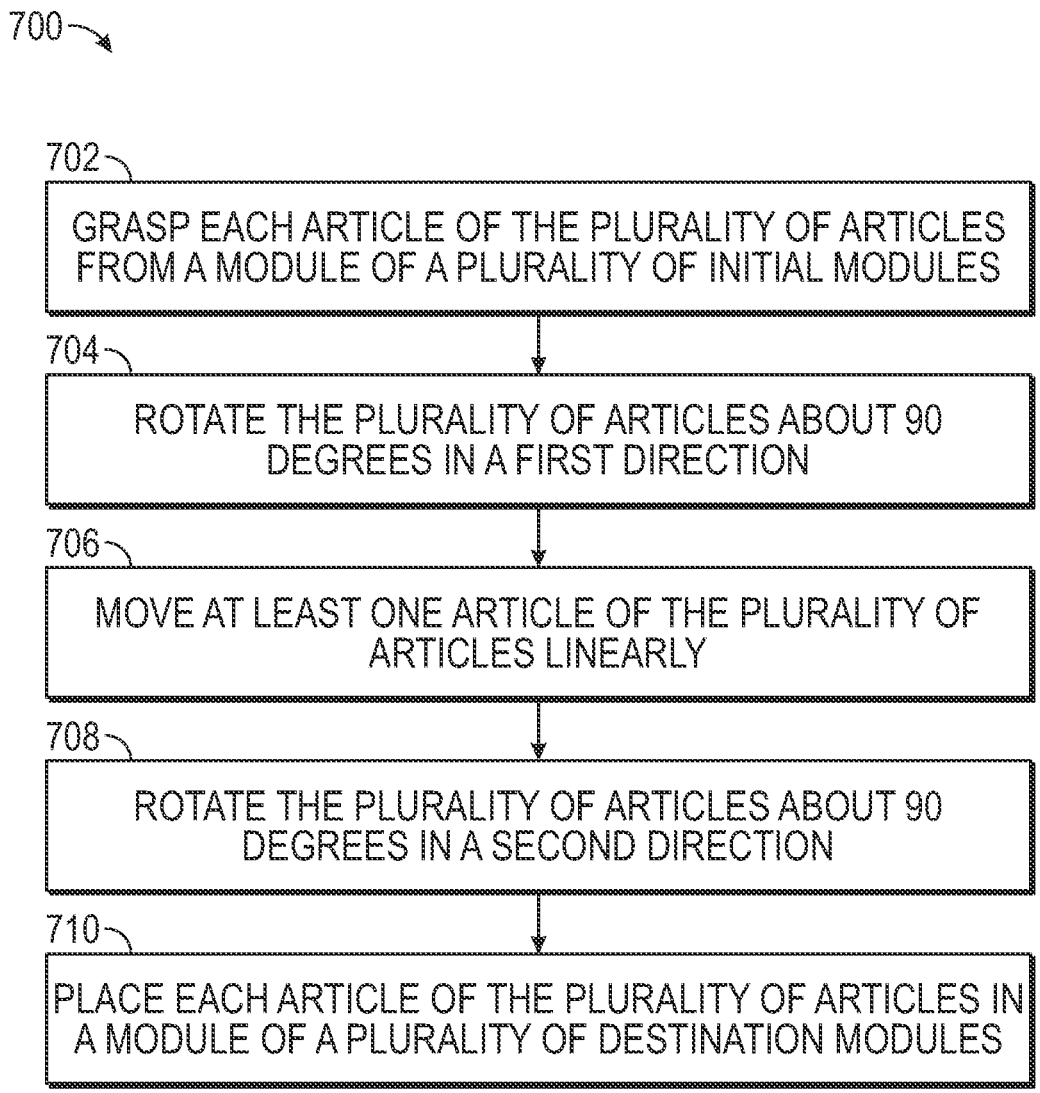
FIG. 7 is a flowchart for moving a plurality of articles simultaneously, according to one embodiment.

FIG. 7 is a flowchart of a method 700 for moving a plurality of articles simultaneously, according to one embodiment. The method 700 begins at block 702, where carriers (e.g., the carriers 104 in FIG. 1) grasp each article of the plurality of articles from a module of a plurality of initial modules as discussed in relation to FIGS. 1-4.

At block 704, a rotary actuator, a shaft, and the carriers (e.g., the rotary actuator 106 and the shaft 110 in FIG. 1) rotate simultaneously the plurality of articles a first angle in a first direction as discussed in relation to FIGS. 1-4.

At block 706, linear actuators (e.g., the linear actuators 102 in FIG. 1) move at least one article of the plurality of articles linearly as discussed in relation to FIGS. 1-4.

At block 708, the rotary actuator, the shaft, and the carriers rotate simultaneously the plurality of articles a second angle in a second direction as discussed in relation to FIGS. 1-4.

At block 710, the carriers place each article of the plurality of articles in a module of a plurality of destination modules as discussed in relation to FIGS. 1-4.

In some embodiments, the second direction is opposite the first direction as discussed in relation to FIGS. 1-4.

In some embodiments, the moving at least one article of the plurality of articles comprises a plurality of linear actuators that move each article of the plurality of articles in a vertical direction as discussed in relation to FIGS. 1-5. The plurality of linear actuators are connected to a shaft having a central axis. In some embodiments, the rotating the plurality of articles comprises a plurality of carriers as discussed in relation to FIGS. 1-5. Each carrier of the plurality of carriers is attached to a linear actuator of the plurality of linear actuators, each carrier of the plurality of carriers grasps each article of the plurality of articles, and a rotary actuator rotates the shaft about the central axis.

In some embodiments, the plurality of initial modules and the plurality of destination modules are processing modules comprising at least one of a pretreatment, printing, curing, drying, or holding module as discussed in relation to FIGS. 2-3.

In some embodiments, the plurality of articles comprises at least one of a platen, a tray, a jig, a fixture, a material to be processed, a container, or a package as discussed in relation to FIG. 2.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

As used herein, the term "about" may refer to a +/−10% variation from the nominal value. It is to be understood that such a variation can be included in any value provided herein.

While the foregoing is directed to embodiments of the present disclosure, other and further embodiments of the disclosure may be devised without departing from the basic scope thereof, and the scope thereof is determined by the claims that follow.

What is claimed is:

1. A conveying system, comprising:
a plurality of linear actuators;
a plurality of carriers, wherein each carrier of the plurality of carriers is attached to a linear actuator of the plurality of linear actuators;
a rotary actuator configured to rotate the plurality of carriers about a shared axis of rotation;
a support structure, wherein the support structure comprises a plurality of processing spaces and a plurality of transition spaces; and
a plurality of processing modules, wherein:
each processing space of the plurality of processing spaces comprises a processing module of the plurality of processing modules; and
the conveying system is configured to move a plurality of articles from a plurality of initial modules of the plurality of processing modules to a plurality of destination modules of the plurality of processing modules.

2. The system of claim 1, wherein each carrier of the plurality of carriers is positioned at a fixed angle from other carriers of the plurality of carriers in relation to the shared axis of rotation.

3. The system of claim 1, wherein the plurality of carriers comprises only two carriers positioned about 180 degrees apart in relation to the shared axis of rotation.

4. The system of claim 1, wherein:
the plurality of carriers comprises at least three carriers; and
each carrier of the at least three carriers is positioned less than about 180 degrees apart from other carriers of the three carriers in relation to the shared axis of rotation.

5. The system of claim 1, wherein each linear actuator of the plurality of linear actuators is configured to actuate each carrier of the plurality of carriers independently of other carriers of the plurality of carriers.

6. The system of claim 1, wherein each carrier of the plurality of carriers is connected to a shaft.

7. The system of claim 1, wherein each carrier of the plurality of carriers is configured to grasp an article.

8. The system of claim 1, wherein the plurality of processing modules comprises different stages of a garment processing system.

9. The system of claim 1, wherein the plurality of transition spaces is used to as a throughway to move a plurality of articles between the plurality of processing modules.

10. The system of claim 9, wherein the plurality of articles comprises a platen or garment.

11. The system of claim 1, further comprising:
a different plurality of linear actuators;
a different plurality of carriers, wherein each carrier of the different plurality of carriers is attached to a linear actuator of the different plurality of linear actuators; and
a different rotary actuator configured to rotate the different plurality of carriers about a different shared axis of rotation;
wherein the carriers of the plurality of carriers and the carriers of the different plurality of carriers may each access at least one shared processing module of the plurality of processing modules.

12. The system of claim 1, further comprising a translation system configured to move the plurality of carriers along a track of the support structure.

13. A conveying system, comprising:
a plurality of linear actuators attached a shaft;
a plurality of carriers attached to the shaft and respective ones of the plurality of linear actuators;
a rotary actuator configured to rotate the shaft along with the plurality of carriers;
a support structure, wherein the support structure comprises a plurality of processing spaces and a plurality of transition spaces; and
a plurality of processing modules, wherein:

each processing space of the plurality of processing spaces comprises a processing module of the plurality of processing modules; and the conveying system is configured to move a plurality of articles from a plurality of initial modules of the plurality of processing modules to a plurality of destination modules of the plurality of processing modules.

\* \* \* \* \*